(12) United States Patent
Kitanaka et al.

(10) Patent No.: US 8,406,953 B2
(45) Date of Patent: Mar. 26, 2013

(54) CONTROL APPARATUS FOR ELECTRIC VEHICLE

(75) Inventors: Hidetoshi Kitanaka, Tokyo (JP);
Shoichi Kawamoto, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 943 days.

(21) Appl. No.: 12/377,097

(22) PCT Filed: Aug. 10, 2006

(86) PCT No.: PCT/JP2006/315820
§ 371 (c)(1),
(2), (4) Date: Feb. 10, 2009

(87) PCT Pub. No.: WO2008/018135
PCT Pub. Date: Feb. 14, 2008

(65) Prior Publication Data
US 2010/0161162 A1 Jun. 24, 2010

(51) Int. Cl.
*G06F 7/00* (2006.01)
(52) U.S. Cl. .................. 701/36; 701/1; 701/19
(58) Field of Classification Search .............. None
See application file for complete search history.

(56) References Cited

U.S. PATENT DOCUMENTS

| | | | | |
|---|---|---|---|---|
| 4,292,531 A | * | 9/1981 | Williamson | 290/14 |
| 5,291,388 A | * | 3/1994 | Heinrich | 363/98 |
| 5,507,153 A | | 4/1996 | Seto et al. | |
| 5,614,796 A | * | 3/1997 | Minderlein et al. | 318/376 |
| 5,670,851 A | * | 9/1997 | Numazaki | 318/106 |
| 5,963,442 A | * | 10/1999 | Yoshida et al. | 363/98 |
| 6,104,166 A | * | 8/2000 | Kikuchi et al. | 320/132 |
| 6,675,597 B2 | * | 1/2004 | Ieda et al. | 62/244 |
| 7,119,454 B1 | * | 10/2006 | Chiao | 307/9.1 |
| 7,201,010 B2 | * | 4/2007 | Homan et al. | 62/228.4 |
| 7,451,842 B2 | * | 11/2008 | Hemmi et al. | 180/65.1 |
| 2003/0105567 A1 | * | 6/2003 | Koenig et al. | 701/36 |
| 2004/0084229 A1 | * | 5/2004 | Stancu et al. | 180/65.1 |
| 2004/0207205 A1 | * | 10/2004 | Kikuchi et al. | 290/40 C |

(Continued)

FOREIGN PATENT DOCUMENTS

| | | | |
|---|---|---|---|
| EP | 1914108 A1 | * | 4/2008 |
| JP | 1-259701 A | | 10/1989 |

(Continued)

OTHER PUBLICATIONS

International Search Report (PCT/ISA/210) dated Oct. 31, 2006.

(Continued)

*Primary Examiner* — Khoi Tran
*Assistant Examiner* — Bhavesh V Amin
(74) *Attorney, Agent, or Firm* — Buchanan Ingersoll & Rooney PC

(57) ABSTRACT

In a control apparatus for an electric vehicle there are provided a first inverter that drives a motor; a second inverter that supplies electric power to a load; a power storage unit that supplies electric power to the first and second inverters; and a load control unit that can control a load amount, in accordance with a power storage amount in the power storage unit, or a condition amount thereof. The load control unit can perform control of an air blower, an air conditioner, and a ventilator, for example, stopping part or all of them.

17 Claims, 4 Drawing Sheets

U.S. PATENT DOCUMENTS

| | | | |
|---|---|---|---|
| 2005/0044868 A1* | 3/2005 | Kobayashi et al. | 62/241 |
| 2006/0144284 A1* | 7/2006 | Martini et al. | 105/35 |
| 2006/0196714 A1* | 9/2006 | Sugimoto et al. | 180/242 |
| 2007/0002995 A1* | 1/2007 | Hemmi et al. | 375/377 |
| 2007/0080008 A1* | 4/2007 | Chiao | 180/65.3 |
| 2008/0169651 A1* | 7/2008 | Oyobe et al. | 290/7 |

FOREIGN PATENT DOCUMENTS

| | | |
|---|---|---|
| JP | 9-247807 A | 9/1997 |
| JP | 11-180137 A | 7/1999 |
| JP | 2001-352607 A | 12/2001 |
| JP | 2006-101698 A | 4/2006 |
| KR | 2001-0059060 | 7/2001 |
| WO | WO 94/21481 A1 | 9/1994 |

OTHER PUBLICATIONS

Office Action from Korean Patent Office dated Sep. 3, 2012, issued in corresponding Korean Patent Application No. 10-2009-7002313, with English translation thereof.

* cited by examiner

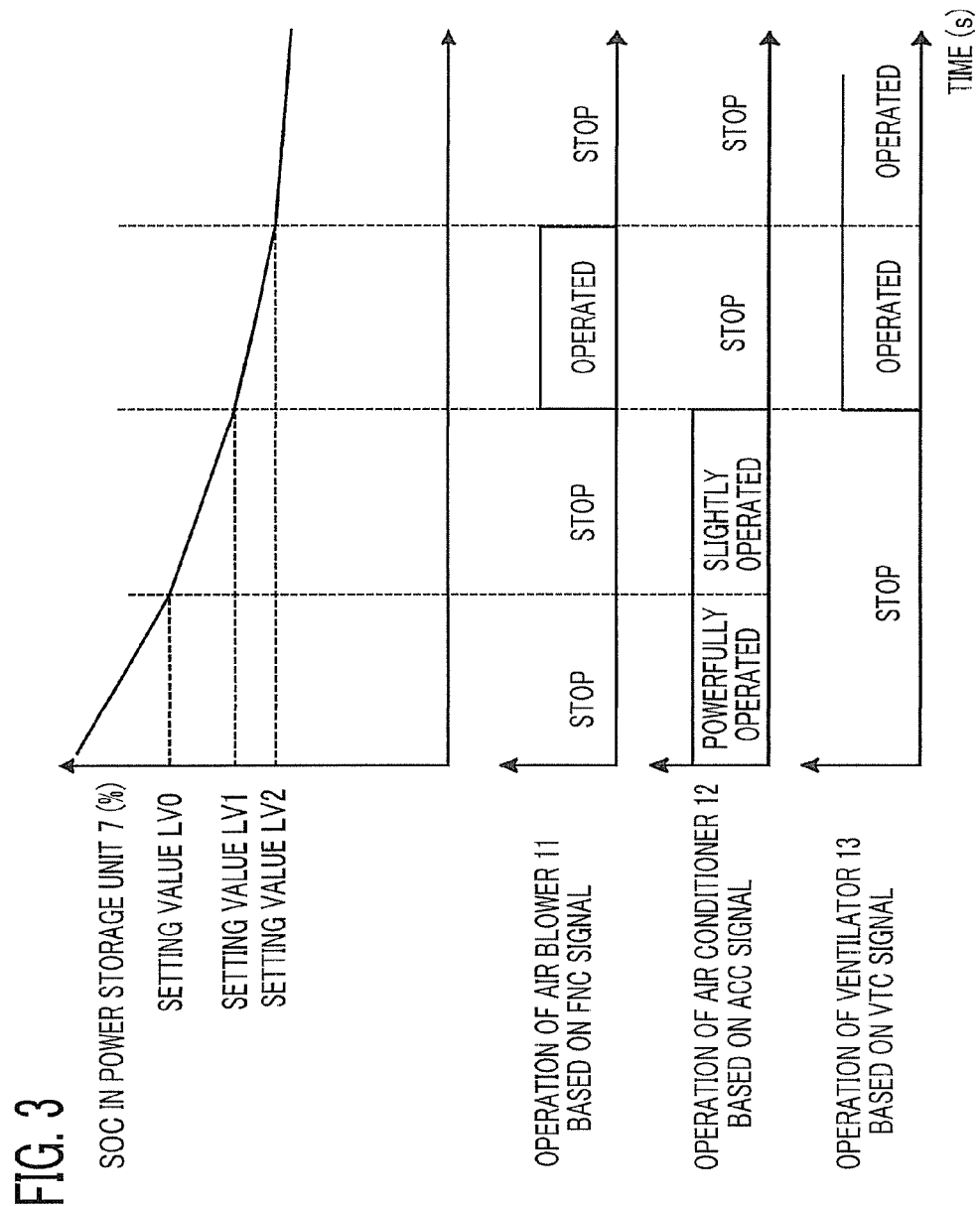

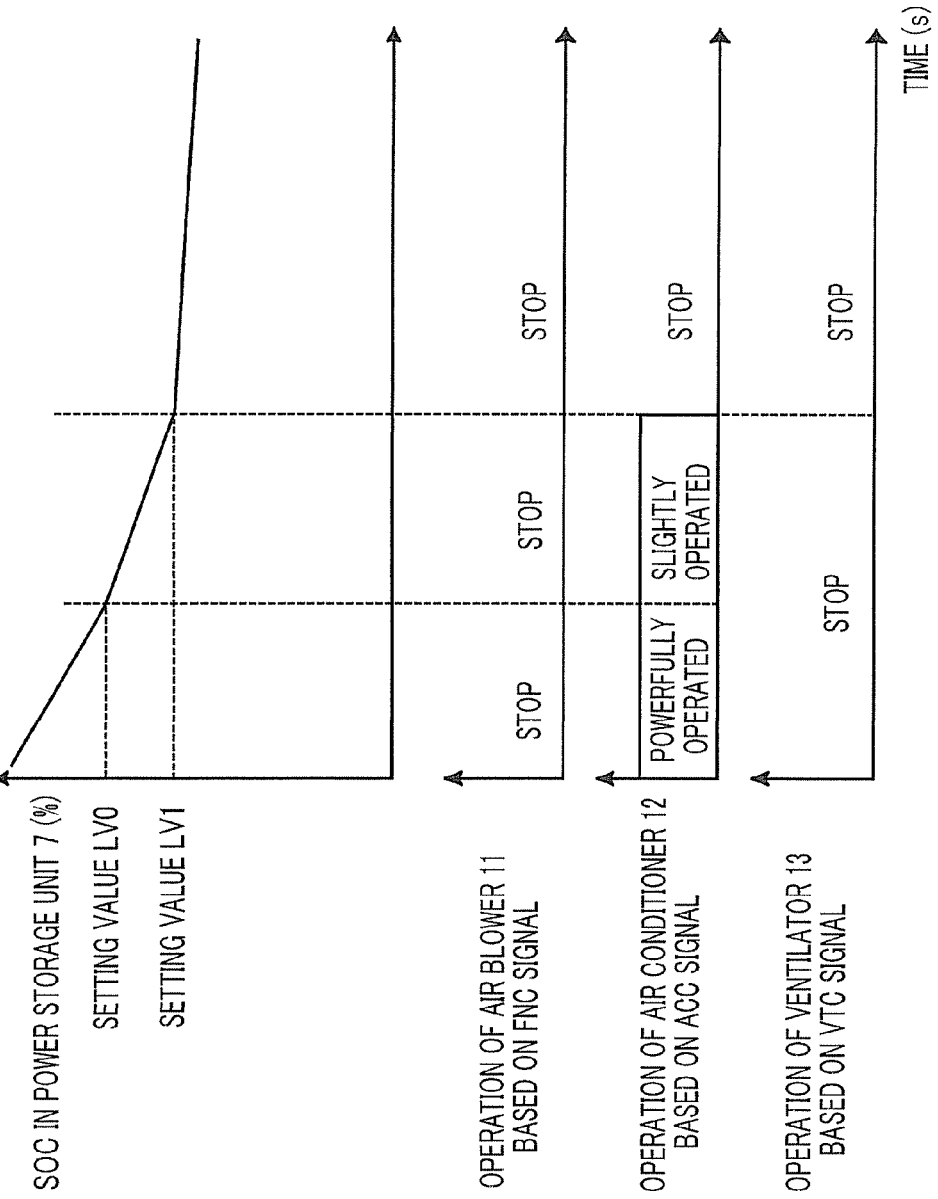

CONTROL APPARATUS FOR ELECTRIC VEHICLE

TECHNICAL FIELD

The present invention relates to a control apparatus for an inverter-driven electric vehicle, and particularly to a controller for an inverter-driven electric vehicle equipped with a power storage unit that is charged with DC power and from which DC power is discharged.

BACKGROUND ART

In recent years, with regard to an inverter-driven electric vehicle, there has been known a battery-driven electric vehicle in which a power storage unit formed of a power storage device such as a battery is mounted, and electric power can be supplied from the power storage unit to an inverter that controls a motor for driving the wheels, so that the electric vehicle can travel even in a section where no overhead line is installed (for example, refer to Patent Document 1).

Recently, development of power storage devices such as a secondary battery and an electric double-layer capacitor has been being carried out actively, and the power storage amount has been enlarged; however, in order to obtain the electric-power amount large enough to make an electric vehicle travel, the current technology requires a considerably large and heavy power storage unit. In this regard however, because the mounting space in an electric vehicle is limited, it is required to suppress as much as possible the size and the mass of a power storage unit; thus, it is likely to difficult to ensure an ample power storage amount. Therefore, it is indispensable to effectively utilize limited storage power.

On the other hand, as an application example of electric vehicle that travels in a section where no overhead line is installed, for example, a suburban train has attracted attentions; by enabling an electric vehicle for a suburban train to travel by means of electric power from the power storage unit, overhead lines of part of the sections of an existing route can be removed, whereby overhead lines and support posts become unnecessary; therefore, the landscape is improved. In particular, in the route provided in the vicinity of a historic building or a scenic spot, the merit of removing the overhead lines and support posts is considerable in terms of the landscape. Moreover, in the case where an existing route is extended, only the lines may be extended without installing overhead lines, as long as the extension distance is not long; thus, there is produced a merit in which the construction costs can be reduced and the construction period can be shortened.

However, because sharing the travel path with an automobile, the suburban train is affected by a traffic jam or the like; therefore, the operational condition of the foregoing suburban train differs from that of an electric vehicle, on an ordinary rail-way route, that can travel in accordance with a predetermined time schedule, for example, in such a way that the travel time or the stoppage time in the section where no overhead line is installed is prolonged.

Accordingly, it is required that the capacity of the power storage unit is estimated with a margin, on the assumption that the travel time or the stoppage time in a section where no overhead line has been installed is prolonged; therefore, there exists a problem that a capacity larger than the capacity that is ordinarily required is necessary. Moreover, in the case where, due to a heavy traffic jam, an electric vehicle is forced to stop for a long time, the air conditioner (a cooling apparatus and a heating apparatus) mounted in the electric vehicle consumes electric power stored in the power storage unit, whereby the electric power becomes insufficient to make the electric vehicle travel, and then the electric vehicle cannot travel any longer; therefore, it is conceivable that the electric vehicle comes to a standstill in a section where no overhead line is installed.

Patent Document 1: Japanese Patent Application Laid-Open No. 2006-101698 (refer to FIG. 9 and Paragraph [0026])

DISCLOSURE OF THE INVENTION

Problems to be Solved by the Invention

The present invention has been implemented in order to solve the foregoing problems; the objective thereof is to provide an electric-vehicle controller that can ensure an electric-power amount that enables an electric vehicle to travel to a section where overhead lines are installed, even in the case where the electric vehicle stays in a section where no overhead line is installed, for a time longer than a preliminarily assumed time.

Means for Solving the Problems

An electric-vehicle controller according to the present invention is provided with a first inverter that drives a motor; a second inverter that supplies electric power to a load; and a power storage unit that supplies electric power to the first and second inverters. The electric-vehicle controller is characterized by including a load control unit that can control a load amount, in accordance with a power storage amount in the power storage unit or a condition amount thereof.

Advantages of the Invention

An electric-vehicle controller according to the present invention can ensure an electric-power amount that enables an electric vehicle to travel to a section where overhead lines are installed, even in the case where the electric vehicle stays in a section where no overhead line is installed, for a time longer than a preliminarily assumed time.

BRIEF DESCRIPTION OF THE DRAWINGS

FIG. 3 is a chart representing the operations, in a cooling state, of an air blower, an air conditioner, and a ventilator according to Embodiment 1 of the present invention; and FIG. 4 is a chart representing the operations, in a heating state, of an air blower, an air conditioner, and a ventilator according to Embodiment 1 of the present invention.

BEST MODE FOR CARRYING OUT THE INVENTION

Embodiment 1

Figure 1:
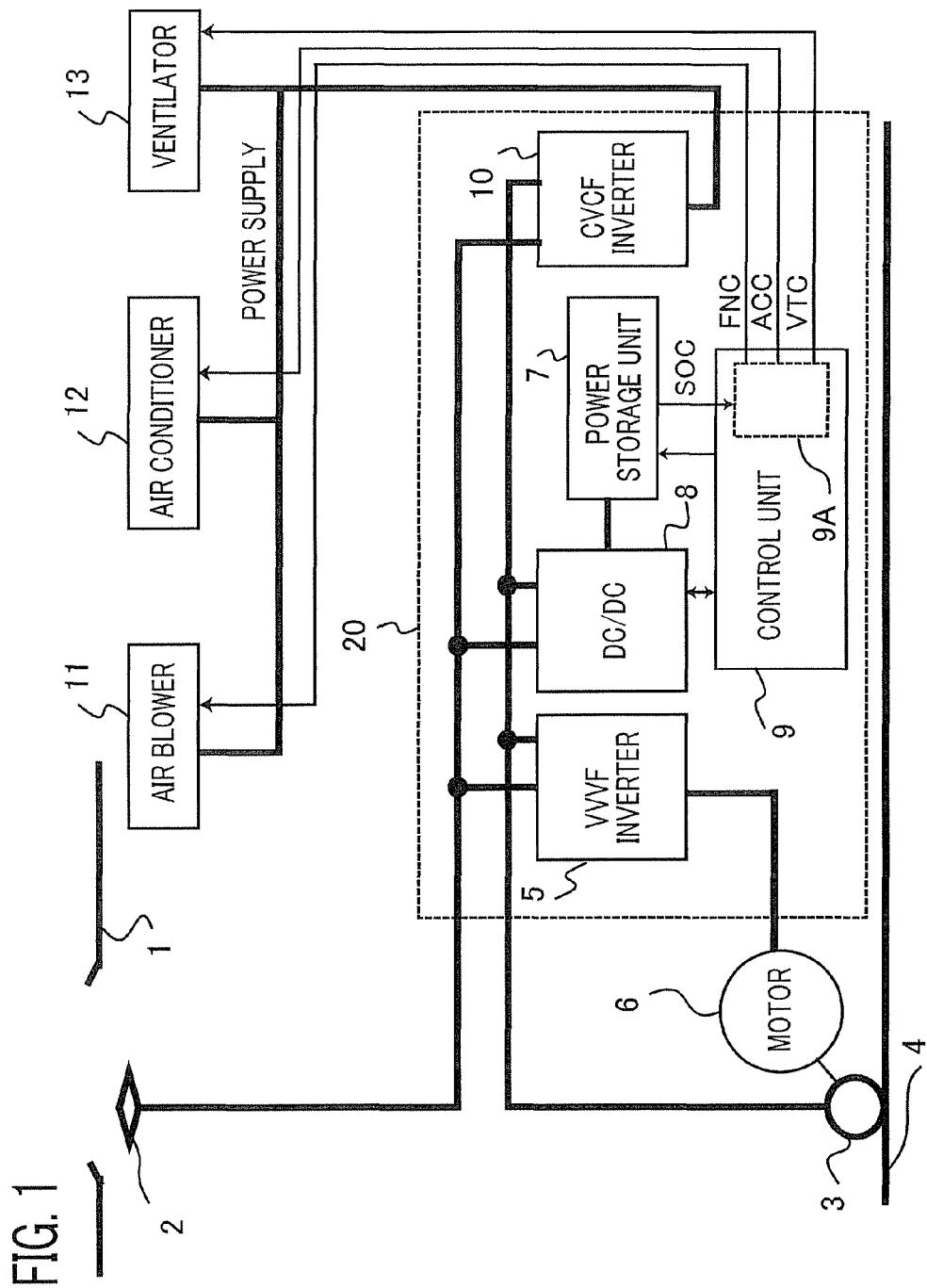
FIG. 1 is a diagram illustrating an example of the configuration of an electric-vehicle controller according to Embodiment 1 of the present invention.

FIG. 1 is a diagram illustrating an example of the configuration of an electric-vehicle controller according to Embodiment 1 of the present invention. In FIG. 1, an electric-vehicle controller 20 is configured in such a way as to be able to receive electric power through an overhead line 1, a pantograph 2, a wheel 3, and a rail 4; the electric-vehicle controller 20 can drive a motor 6 and can supply electric power to loads such as an air blower 11, an air conditioner 12, and a ventilator 13. In addition, FIG. 1 illustrates a case in which an electric vehicle travels in a section where no overhead line 1 is installed.

The electric-vehicle controller 20 is configured with a variable-voltage, variable-frequency (VVVF) inverter 5 that drives the motor 6; a power storage unit 7 connected with a DC-to-DC converter 8; a control unit 9 that controls the power storage unit 7 and the DC-to-DC converter 8; and a constant-voltage, constant-frequency (CVCF) inverter 10 that supplies electric power to the air blower 11, the air conditioner 12, and the ventilator 13, which are the foregoing loads. In the control unit 9, there is provided a load control unit 9A that measures the power storage amount in the power storage unit 7 and controls the amount of loads for the foregoing loads. In addition, although not illustrated, the CVCF inverter 10 supplies electric power also to loads such as fluorescent lamps and broadcasting apparatuses; however, because the power consumption by the foregoing loads is small, the explanations therefor are omitted. The power storage unit 7 is formed of a power storage device such as an electric double layer capacitor or a secondary battery; in the current technology, the power storage amount is limited to approximately 50 kWh, due to restriction on the mounting space.

Figure 2:
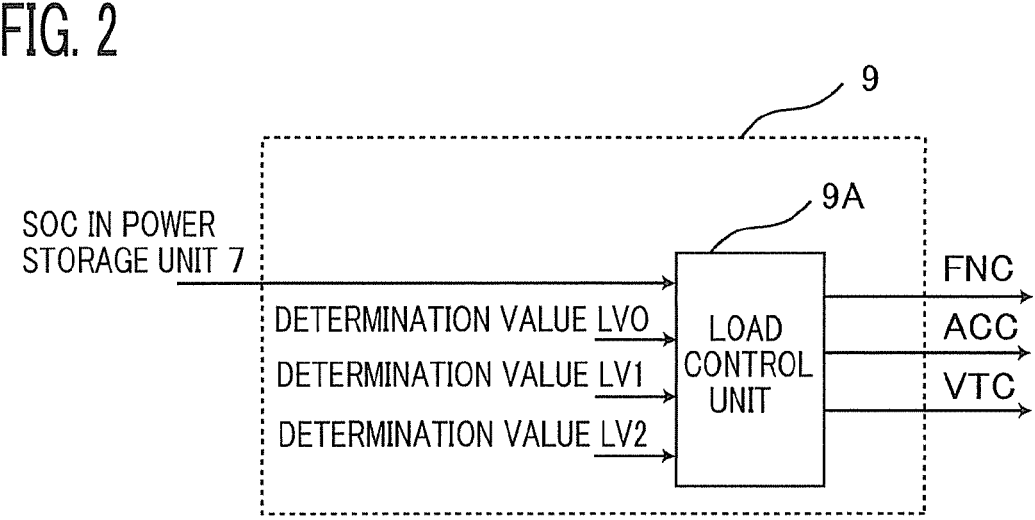
FIG. 2 is a diagram illustrating an example of the configuration of a load control unit according to Embodiment 1 of the present invention.

FIG. 2 is a diagram illustrating an example of the configuration of the load control unit 9A according to Embodiment 1 of the present invention. As illustrated in FIG. 2, the load control unit 9A is provided in the control unit 9, measures the power storage amount (referred to as SOC, hereinafter) in the power storage unit 7, and compares the SOC with setting values LV0, LV1, and LV2. In accordance with the result of the comparison, the load control unit 9A outputs control signals FNC, ACC, and VTC, and the control signals FNC, ACC, and VTC are inputted to the air blower 11, the air conditioner 12, and the ventilator 13, respectively, so that the operations of the air blower 11, the air conditioner 12, and the ventilator 13 can be controlled. The specific control logic will be described later with reference to FIGS. 3 and 4. "SOC" is the abbreviation of "State of Charge" that denotes the proportion of the power storage amount with respect to the amount of full charge. In the case where half of the power storage amount is consumed, SOC is 50%, and in the case where the power storage amount is fully discharged, SOC is 0%. The SOC can be calculated based on the terminal voltage of the power storage unit 7 or the charging/discharging current; as publicly known technologies, there exist various kinds of configurations.

The present invention is characterized in that, in accordance with the power storage amount in the power storage unit 7, the control unit 9 can directly or indirectly control the air blower 11, the air conditioner 12, and the ventilator 13.

The direct control configuration denotes, as illustrated in FIG. 1, a configuration in which the load control unit 9A of the control unit 9 directly feeds the control signals FNC, ACC, and VTC to the air blower 11, the air conditioner 12, and the ventilator 13, respectively; the indirect control configuration denotes a configuration in which, in addition to the control unit 9, there is provided a vehicle management control apparatus (unillustrated) that can collect information on the apparatuses in the vehicle and control the apparatuses, and in the vehicle management control apparatus, there is provided a load control unit 9A that inputs information on the power storage amount, and then the air blower 11, the air conditioner 12, and the ventilator 13 are controlled by the intermediary of the load control unit 9A.

As the configuration of the present invention, either the direct control configuration or the indirect control configuration may be adopted. In addition, there may be adopted a configuration in which the air blower 11, the air conditioner 12, and the ventilator 13 each access the control unit 9 or the load control unit 9A in the vehicle management control apparatus, autonomously comprehend the power storage amount, and then control the operation conditions thereof. In sum, the present invention is configured in such a way that, in accordance with the power storage amount in the power storage unit 7, the load control unit 9A can control the air blower 11, the air conditioner 12, and the ventilator 13.

The operation of the electric-vehicle controller 20 configured as described above will be explained with reference to FIG. 1. In the case where an electric vehicle travels in a section where overhead lines have been installed, operation of the electric vehicle is performed in such a way that the control unit 20 in the electric vehicle 20 receives DC power across the overhead line 1 and the rail 4, via the pantograph 2 and the wheel 3; the VVVF inverter 5 drives the motor 6; and the CVCF inverter 10 supplies electric power to the air blower 11, the air conditioner 12, and the ventilator 13. In contrast, in the case where the electric vehicle travels in a section where no overhead line has been installed (in the case illustrated in FIG. 1), operation of the electric vehicle is performed in such a way that, by use of electric power stored in the power storage unit 7 disposed in the electric-vehicle controller 20, the VVVF inverter 5 drives the motor 6, and the CVCF inverter 10 supplies electric power to the air blower 11, the air conditioner 12, and the ventilator 13.

In addition, charging of the power storage unit 7 may be performed by the intermediary of the DC-to-DC converter 8 while an electric vehicle travels in a section where overhead lines have been installed, or, although not illustrated, the charging may be performed by the intermediary of an external charging apparatus, for example, while the electric vehicle is in a standstill at a station; alternatively, the power storage unit 7 may be replaced by a power storage unit that has already been charged; i.e., the charging method is not limited.

In FIG. 1, the air conditioner 12 is a generic name for a cooling apparatus and a heating apparatus, which are apparatuses for maintaining the temperature in each of the cars of an electric vehicle to be a comfortable temperature. As publicly known, a cooling apparatus is configured in such a way that a motor drives a compressor to circulate a refrigerant so that heat can be transported; a cooling apparatus is configured in such a way as to absorb heat in a car through an in-vehicle heat exchanger (so called an evaporator), and to radiate heat absorbed through an out-vehicle heat exchanger (so called a condenser). It is also well known that the in-vehicle heat exchanger and the out-vehicle heat exchanger positively circulate air through an in-vehicle fan (so called an evaporator fan) and an out-vehicle fan (so called a condenser fan), respectively. The configuration of a heating apparatus is also publicly well known; a heating apparatus is formed of a heating wire, a semiconductor heater, or the like. In addition, there may be adopted a heat-pump heating apparatus that is configured in a way reverse to the way in which a cooling apparatus is configured and transports external heat to the inside of the car.

In this situation, the power consumption amount of the air conditioner 12 (a cooling apparatus and a heating apparatus) will be explained below. The power consumption of a cooling apparatus mounted in a single car of a common suburban train is approximately 15 kW. Accordingly, in the case where the cooling apparatus is fully operated, the power consumption amount of the cooling apparatus is approximately 15 kWh. In particular, the power consumption of a motor that drives a compressor is approximately 10 kW and accounts for nearly all of the whole power consumption; the power consumption of each of the out-vehicle fan and the in-vehicle fan is approximately several tens watts to hundred watts and accounts for only small proportion of the whole power consumption. The power consumption of a heating apparatus mounted in a single car of a common suburban train is nearly the same as the foregoing power consumption; therefore, even in the case where the heating apparatus is fully operated in winter, the power consumption amount thereof is approximately 15 kWh. In other words, the air conditioner 12 consumes an electric power amount of approximately 15 kWh in summer as well as in winter.

On the other hand, as described above, the power storage amount of the power storage unit 7 is approximately 50 kWh; therefore, in the case where only the air conditioner 12 is fully operated, all the electric power stored in the power storage unit 7 is consumed in 3.3 (=50 kwh/15 kWh) hours. In fact, if all the power storage amount of the power storage unit 7 is discharged, the secondary battery included in the power storage unit 7 is deteriorated permanently; thus, the maximum allowable discharge amount is approximately 70% of the whole capacity. Accordingly, the time period in which the power storage amount has been consumed to an extent such that the secondary battery is not deteriorated permanently is 2.3 (=3.3 hours×0.7) hours.

In addition, the air blower 11 is a so-called electric fan provided in a car; the ventilator 13 is an apparatus that discharges in-vehicle air to the outside of a car and takes in out-vehicle fresh air into a car. The respective power consumptions thereof are approximately several tens watts and considerably small compared with the power consumption of the air conditioner, i.e., one-hundredth thereof or smaller. In the case where, as the air conditioner 12, a cooling apparatus is considered, the power consumption of an in-vehicle fan incorporated in the cooling apparatus is considerably small, e.g., several tens watts to hundred watts, as described above.

Next, the electric power amount required for a car to travel will be explained below. The rated output of the motor 6 in a common suburban train is approximately 120 kW; thus, the time period in which the power storage amount has been consumed to an extent such that the secondary battery is not deteriorated permanently is approximately 17.5 minutes (=50 kWh×0.7/120 kWh). As described above, it can be seen that the electric power amount consumed by the air conditioner 12 exceeds 16% of the electric power amount required for a car to travel, i.e., considerably large.

Even in the case where an electric vehicle is in a stop state, the air conditioner 12 continues to consume electric power in order to maintain the in-vehicle temperature.

Accordingly, it is required that the capacity of the power storage unit 7 mounted in an electric vehicle is estimated with a margin, on the assumption that the travel time or the stoppage time in a section where no overhead line has been installed is prolonged; therefore, there exists a problem that a capacity larger than the capacity that is ordinarily required is necessary. Furthermore, in the case where, due to a heavy traffic jam, an electric vehicle is forced to stop for a long time, the air conditioner 12 mounted in the electric vehicle consumes electric power stored in the power storage unit 7, whereby the electric power amount required for the electric vehicle to travel becomes insufficient, and then the motor 6 cannot be driven; therefore, it is conceivable that the electric vehicle comes to a standstill in a section where no overhead line is installed.

Accordingly, in order to solve the foregoing problems, the present invention is configured in such a way that, in accordance with the SOC in the power storage unit 7, the air conditioner 12, the air blower 11, and the ventilator 13 are controlled. A specific control method will be explained below. FIG. 3 is a chart representing the operations of the air blower 11, the air conditioner 12, and the ventilator 13 according to Embodiment 1 of the present invention. FIG. 3 represents a state in which, in summer, the air conditioner 12 (a cooling apparatus) is in operation, a traffic jam or the like causes the electric vehicle to be in a stop state for a long time in a section where no overhead line 1 is installed, and hence the SOC lowers gradually. As represented in FIG. 3, when the SOC in the power storage unit 7 becomes smaller than a first setting value LV0, the load control unit 9A changes the operation mode of the air conditioner 12 from powerful operation mode to slight operation mode, through the signal ACC. As a result, because the power consumption amount is reduced, the reduction rate of the SOC becomes small.

When the SOC becomes further smaller, i.e., smaller than a second setting value LV1, the load control unit 9A stops the operation of the air conditioner 12, through the signal ACC. At the same time, in order to maintain the in-vehicle temperature environment, the air blower 11 is activated through the signal FNC, and in order to prevent the in-vehicle temperature from rising, the ventilator 13 is operated through the signal VTC. In this situation, the air conditioner 12 may be operated in such a way that the motor for the compressor and the out-vehicle fan are stopped, and the operation of the in-vehicle fan whose power consumption is sufficiently small is continued. In such a way as described above, at least air blowing into the inside the vehicle can be performed; therefore, the minimally necessary comfortability in the vehicle can be maintained, when the SOC becomes further smaller, i.e., smaller than a third setting value LV2, the load control unit 9A stops the operation of the air blower 11, through the signal FNC, and operates only the ventilator 13. It is preferable that, in order to suppress the rise of the in-vehicle temperature from increasing, the operation of the ventilator 13 is continued even when the SOC lowers.

FIG. 4 is a chart representing the operations of the air blower 11, the air conditioner 12, and the ventilator 13 according to Embodiment 1 of the present invention. FIG. 4 represents a state in which, in winter, the air conditioner 12 (a heating apparatus) is in operation, a traffic jam or the like causes the electric vehicle to be in a stop state for a long time in a section where no overhead line 1 is installed, and hence the SOC lowers gradually. As represented in FIG. 4, when the SOC in the power storage unit 7 becomes smaller than a first setting value LV0, the load control unit 9A changes the operation mode of the air conditioner 12 from powerful operation mode to slight operation mode, through the signal ACC. As a result, because the power consumption amount is reduced, the reduction rate of the SOC becomes small. When the SOC becomes further smaller, i.e., smaller than a second setting value LV1, the load control unit 9A stops the operation of the air conditioner 12, through the signal ACC. In addition, it is preferable that the air blower 11 is stopped because it is not necessary in winter, and the ventilator 13 is also stopped when ventilation is not required.

In addition, the first, second, and third setting values LV0, LV1, and LV2 described above may be predetermined constant values, or variable depending on the conditions. For example, in the case where the first, second, and third setting values LV0, LV1, and LV2 are made variable depending on the time that is necessary for an electric vehicle to reach a section where overhead lines are installed and the remaining distance, the operation of the air conditioner 12 can maximally be ensured, whereby the in-vehicle environment can be maintained longer. Additionally, it goes without saying that, even in the case where the power storage amount SOC in the power storage unit 7 is smaller than the first setting value LV0, the second setting value LV1, or the third setting value LV2, the operation of the air conditioner 12 is resumed, or returned to powerful operation, as long as the vehicle has reached a section where overhead line 1 is installed and can be receive electric power from the overhead line 1. Information on whether or not the vehicle can receive electric power from the overhead line 1 may be inputted to the load control unit 9A, or it may be determined by the load control unit 9A that the vehicle receives electric power from the overhead line 1 because the SOC in the power storage unit 7 increases.

As described above, even in the case where an electric vehicle stops for a long time in a section where no overhead line is installed, the consumption, by the air conditioner 12, of the power storage amount is suppressed in order to suppress the SOC in the power storage unit 7 from decreasing, so that it is made possible to maintain the in-vehicle temperature environment as much as possible and to ensure an electric power amount necessary for an electric vehicle to travel. As a result, by ensuring an electric power amount necessary for an electric vehicle to travel, it is made possible to make the electric vehicle travel to a section where overhead lines are installed. Moreover, it is not required to leave a large margin in the power storage amount in the power storage unit 7 in preparation against a long stoppage in a section where no overhead line is installed; therefore, the power storage unit 7 can be downsized to a critical mass.

In embodiment 1, the air conditioner 12 is controlled step by step in accordance with three modes, i.e., a powerful operation mode, a slight operation mode, and a stoppage mode; however, continuous control from the powerful operation mode to the stoppage mode may be adopted. The air blower 11 and the ventilator 12 are operated in the case where the SOC becomes smaller than the second setting value LV1; however, because, as already described, the power consumptions thereof are small, the air blower 11 and the ventilator 12 may be operated even in the case where the SOC is the same as or larger than the second setting value LV1.

In FIG. 1, the electric-vehicle controller 20 is configured in such a way that the load control unit 9A that controls the air blower 11, the air conditioner 12, and the ventilator 13 is incorporated in the control unit 9 that controls the DC-to-DC converter 8 and the power storage unit 7, and the power storage amount in the power storage unit 7 is transmitted to the load control unit 9A; however, the present invention is not limited thereto. The load control unit 9A may be incorporated in an unillustrated control unit of the VVV inverter 5, in an unillustrated control unit of the CVCF inverter 10, or in a control unit (unillustrated) that incorporates the respective control units of the VVV inverter 5 and the CVCF inverter 10.

Alternatively, information on the SOC may be transmitted to a vehicle management control apparatus (unillustrated) having a function of collecting respective information items on the operations of apparatuses in the vehicle and controlling the apparatuses in accordance of the circumstances. On the other hand, there may be adopted a configuration in which the air blower 11, the air conditioner 12, and the ventilator 13 each access the load control unit 9A or the vehicle management control apparatus, autonomously comprehend the SOC, and then control the operation conditions thereof.

In addition, in Embodiment 1, the loads are controlled through the power storage amount SOC in the power storage unit 7; however, for example, the power storage amount can be calculated through the condition amount such as the voltage of the power storage unit 7. As an example, an electric double layer capacitor that is suitable to be used as the power storage unit 7 can provide the possibility of readily calculating the power storage amount based on the voltage across it. Accordingly, Embodiment 1 is not limited to a configuration in which the load control is performed through the SOC; it goes without saying that there can also be performed a configuration in which the SOC is replaced by the voltage or the like of the power storage unit 7.

In FIG. 1, as the electric-vehicle controller 20, there is illustrated an apparatus configuration that includes the VVVF inverter 5, the DC-to-DC converter 8, the power storage unit 7, the CCF inverter 10, and the control unit 9 having the load control unit 9A; however, as described above, in the case where the load control unit 9A is provided in the vehicle management control apparatus (unillustrated) or in at least one of the air blower 11, the air conditioner 12, and the ventilator 13, the load control unit 9A in that apparatus is included in the electric-vehicle controller 20. In sum, as long as at least one of the air blower 11, the air conditioner 12, and the ventilator 13 can be controlled in accordance with the power storage amount in the power storage unit 7 or the condition amount thereof, any kind of system configuration may be adopted; thus, the present invention is not limited to the configuration illustrated in FIG. 1. In addition, in the case where the load control unit is provided in an apparatus different from the control unit, the power storage amount SOC in the power storage unit or the condition amount thereof is transmitted from the power storage unit to the load control unit, in a direct manner or via the control unit or another apparatus.

In addition, in Embodiment 1, the foregoing explanation has been implemented in consideration of application of the electric-vehicle controller 20 to a suburban train; however, it goes without saying that the application field is not limited thereto, and the present invention can be applied to various kinds of moving bodies, such as an automobile and an elevator, that utilize energy storage. The configurations described in the foregoing embodiment are examples of the aspects of the present invention and can be combined with other publicly known technologies; it goes without saying that various features of the present invention can be configured, by modifying, for example, partially omitting the foregoing embodiments, without departing from the scope and spirit of the present invention.

The invention claimed is:

1. A control apparatus for an electric vehicle, comprising:
   a first inverter that supplies electric power to a motor that drives a vehicle;
   a second inverter that supplies electric power to a load mounted in the vehicle;
   a power storage unit that supplies electric power to the first and second inverters; and
   a load control unit that selectively operates an air conditioner, a ventilator, and an air blower that are included in the load so as to maintain an in-vehicle temperature environment, in accordance with a power storage amount in the power storage unit or a condition amount and a predetermined setting value thereof,
   wherein the setting value consists of a first setting value and a second setting value that is smaller than the first setting value; and
   wherein, in the case where the power storage amount becomes smaller than the first setting value, the air conditioner is slightly operated, and in the case where the power storage amount becomes smaller than the second setting value, the air conditioner is stopped, and at least one of the ventilator and the air blower is operated.

2. A control apparatus for an electric vehicle, comprising:
   a first inverter that supplies electric power to a motor that drives a vehicle;
   a second inverter that supplies electric power to a load mounted in the vehicle;

a power storage unit that supplies electric power to the first and second inverters; and a load control unit that selectively operates an air conditioner, a ventilator, and an air blower that are included in the load so as to maintain an in-vehicle temperature environment, in accordance with a power storage amount in the power storage unit or a condition amount and a predetermined setting value thereof, wherein the setting value is made variable depending on a time that is necessary for the vehicle to reach a section where overhead lines are installed and a distance between the present position of the vehicle and the section.

3. The control apparatus for an electric vehicle according to claim 1, wherein, in the case where the vehicle can receive electric power from an overhead line, the load control unit resumes ordinary operation of the load, regardless of the power storage amount and the setting value.

4. The control apparatus for an electric vehicle according to claim 1, wherein the load control unit is provided in a control unit that controls the power storage unit.

5. The control apparatus for an electric vehicle according to claim 1, wherein the load control unit is provided in a vehicle management control apparatus that collects information items on apparatuses in a vehicle and controls the apparatuses.

6. The control apparatus for an electric vehicle according to claim 1, wherein the load control unit is provided in at least one of an air conditioner, an air blower, and a ventilator that are included in the load.

7. The control apparatus for an electric vehicle according to claim 1, wherein the load control unit is an apparatus that is different from the control unit that controls the power storage unit, and the power storage unit transmits a power storage amount therein or a condition amount thereof to the load control unit.

8. An control apparatus for an electric vehicle comprising:
a first inverter that supplies electric power to a motor that drives a vehicle;
a second inverter that supplies electric power to a load mounted in the vehicle;
a power storage unit that supplies electric power to the first and second inverters; and
a load control unit that controls the load in accordance with a power storage amount in the power storage unit or a condition amount thereof, wherein the load control unit stops a compressor driving motor and an out-vehicle fan that are incorporated in an air conditioner as the load, and operates an in-vehicle fan, in accordance with a power storage amount or a condition amount.

9. The control apparatus for an electric vehicle according to claim 8, wherein the load control unit is provided in a control unit that controls the power storage unit.

10. The control apparatus for an electric vehicle according to claim 8, wherein the load control unit is provided in a vehicle management control apparatus that collects information items on apparatuses in a vehicle and controls the apparatuses.

11. The control apparatus for an electric vehicle according to claim 8, wherein the load control unit is provided in at least one of an air conditioner, an air blower, and a ventilator that are included in the load.

12. The control apparatus for an electric vehicle according to claim 8, wherein the load control unit is an apparatus that is different from the control unit that controls the power storage unit, and the power storage unit transmits a power storage amount therein or a condition amount thereof to the load control unit.

13. The control apparatus for an electric vehicle according to claim 2, wherein, in the case where the vehicle can receive electric power from an overhead line, the load control unit resumes ordinary operation of the load, regardless of the power storage amount and the setting value.

14. The control apparatus for an electric vehicle according to claim 2, wherein the load control unit is provided in a control unit that controls the power storage unit.

15. The control apparatus for an electric vehicle according to claim 2, wherein the load control unit is provided in a vehicle management control apparatus that collects information items on apparatuses in a vehicle and controls the apparatuses.

16. The control apparatus for an electric vehicle according to claim 2, wherein the load control unit is provided in at least one of an air conditioner, an air blower, and a ventilator that are included in the load.

17. The control apparatus for an electric vehicle according to claim 2, wherein the load control unit is an apparatus that is different from the control unit that controls the power storage unit, and the power storage unit transmits a power storage amount therein or a condition amount thereof to the load control unit.

* * * * *